United States Patent
de Aguiar et al.

(10) Patent No.: US 10,762,432 B2
(45) Date of Patent: Sep. 1, 2020

(54) SEMANTIC ANALYSIS NETWORK RESOURCE PROVIDER RECOMMENDATION SYSTEM

(71) Applicant: International Business Machines Corporation, Armonk, NY (US)

(72) Inventors: Murilo Goncalves de Aguiar, Anerucaba (BR); Guilherme Steinberger Elias, Campinas (BR); Marco Vinicius Landivar Paraiso, Campinas (BR); Fabio Minoru Tanada, Campinas (BR); Sergio Varga, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 14/990,094

(22) Filed: Jan. 7, 2016

(65) Prior Publication Data
US 2017/0200084 A1    Jul. 13, 2017

(51) Int. Cl.
*G06N 5/04*    (2006.01)

(52) U.S. Cl.
CPC .................................. *G06N 5/04* (2013.01)

(58) Field of Classification Search
CPC ........................................................ G06N 5/04
See application file for complete search history.

(56) References Cited

U.S. PATENT DOCUMENTS

| 8,402,139 | B2 | 3/2013 | Ferris |
| 8,793,378 | B2 | 7/2014 | Allam |
| 2009/0216691 | A1* | 8/2009 | Borzestowski ..... G06F 17/3066 706/11 |
| 2011/0016214 | A1 | 1/2011 | Jackson |
| 2011/0138050 | A1 | 6/2011 | Dawson |
| 2011/0145094 | A1 | 6/2011 | Dawson |
| 2011/0270968 | A1 | 11/2011 | Salsburg |

(Continued)

OTHER PUBLICATIONS

Zhipeng Gui et al., A Service Brokering and Recommendation Mechanism for Better Selecting Cloud Services, PLoS One, vol. 9, Issue 8, e105297 (Aug. 29, 2014) pp. 1-20 )[retrieved on Sep. 26, 2018 ] (2014).*

(Continued)

*Primary Examiner* — Vincent Gonzales
*Assistant Examiner* — Kevin W Figueroa
(74) *Attorney, Agent, or Firm* — Peter K. Suchecki

(57) ABSTRACT

A system, method and program product for recommending a network resource provider to a resource consumer. An interactive recommendation engine for determining a recommendation of a network resource provider is provide and includes: a requirements collection manager that collects a set of requirements for an organization and includes: a query management system that provides an interactive platform for implementing a natural language dialog with a user; and a semantic analysis system that analyzes inputs from the user to identify requirements and formulate outputs to the user; a provider data curation manager that curates structured and unstructured provider information into a provider knowledgebase; and a decision analytics system that analyzes the set of requirements and provider knowledgebase to identify a recommended resource provider.

19 Claims, 4 Drawing Sheets

(56) References Cited

U.S. PATENT DOCUMENTS

| | | |
|---|---|---|
| 2012/0137001 A1 | 5/2012 | Ferris |
| 2012/0246317 A1 | 9/2012 | Eriksson |
| 2012/0284410 A1 | 11/2012 | Dudek |
| 2012/0304179 A1 | 11/2012 | Devarakonda |
| 2012/0311154 A1* | 12/2012 | Morgan ............ H04L 12/6418 709/226 |
| 2013/0205007 A1 | 8/2013 | Ayachitula |
| 2014/0074647 A1 | 3/2014 | Mukherjee |
| 2014/0280946 A1 | 9/2014 | Mukherjee |

OTHER PUBLICATIONS

Amrutha. K. K, Madhu. B. R, "An Efficient Approach to Find Best Cloud Provider Using Broker"; International Journal of Advanced Research in Computer Science and Software Engineering; Jul. 2014; 4 pages; vol. 4—Issue 7, Publisher: Ijarcsse.

Zhipeng Gui, Chaowei Yang, Jizhe Xia, Qunying Huang, Kai Liu, Zhenlong Li, Manzhu Yu, Min Sun, Nianyin Zhou, Baoxuan Jin; "A Service Brokering and Recommendation Mechanism for Better Selecting Cloud Services"; Public Library of Science, PLOS one; Aug. 29, 2014; 17 pages; Published online.

Grance, Timothy; Mell, Peter; "The NIST Definition of Cloud Computing"; National Institute of Standards and Technology. Sep. 2011; 7 pages; Publisher: Information Technology Laboratory, Gaithersburg, MD.

\* cited by examiner

SEMANTIC ANALYSIS NETWORK RESOURCE PROVIDER RECOMMENDATION SYSTEM

TECHNICAL FIELD

The subject matter of this invention relates to cloud computing, and more particularly to a system and method of providing cloud provider recommendations using semantic analytics.

BACKGROUND

Today, when an organization decides to migrate their processing workload to a cloud infrastructure or create a new application in the cloud they need to evaluate which cloud provider can best meet their requirements. In general, organizations consider their current workload technical specifications, e.g., disk and central processing unit (CPU) consumption and budget, and try to identify cloud offerings that meet their needs.

However, in most cases, organizations do not have all information that is needed to reach an effective decision regarding which cloud provider and service model best fits current and future needs. Furthermore, the decision-making process can be complex, as there are several options (e.g., Infrastructure as a Service, Platform as a Service, Software as a Service), each one with different pricing models and features.

Moreover, choosing the best cloud provider goes beyond technical environment specifications and budget. Just as important is providing a solution to connect with the organization's business needs and strategy. Due to: (1) the number of cloud providers; (2) different types of cloud deployment and service models; (3) the benefits that each one can provide; and (4) specific business requirements that each customer may have, it becomes practically impossible to identify the best solution without professional assistance. Currently, there exists no mechanism to perform such a comprehensive evaluation in an automated manner by relying solely on data provided by the cloud providers.

SUMMARY

Aspects of the disclosure provide a solution for advising organizations on the selection of cloud providers and solution models based on a number of variables. The variables include not only technical requirements and budgets, but also factors such as business needs, historical trending, and value add offerings. The approach includes the use of a semantic analysis of non-structured input from the organization as well as structured information, such as service and cost models, from available providers.

A first aspect discloses an interactive recommendation engine for recommending a network resource provider, comprising: a requirements collection manager that collects a set of requirements for an organization and includes: a query management system that provides an interactive platform for implementing a natural language dialog with a user; and a semantic analysis system that analyzes inputs from the user to identify requirements and formulate outputs to the user; a provider data curation manager that curates structured and unstructured provider information into a provider knowledgebase; and a decision analytics system that analyzes the set of requirements and provider knowledgebase to identify a recommended resource provider.

A second aspect discloses a computer program product stored on a computer readable storage medium, which when executed by a computing system, recommends a network resource provider, comprising: programming instructions that collect a set of requirements from an organization and includes: programming instructions that provide an interactive platform for implementing a natural language dialog with a user; programming instructions that analyze inputs from the user to identify requirements and formulate outputs to the user; programming instructions that curate structured and unstructured provider information into a provider knowledgebase; and programming instructions that analyze the set of requirements and provider knowledgebase to identify a recommended resource provider.

A third aspect discloses a computerized method for recommending a network resource provider, comprising: collecting a set of requirements from an organization, wherein the collecting includes utilizing an interactive platform that provides a natural language dialog with a user and analyzing inputs from the user to identify requirements and formulate outputs to the user; curating structured and unstructured provider information into a provider knowledgebase; and analyzing the set of requirements and provider knowledgebase to identify a recommended resource provider.

BRIEF DESCRIPTION OF THE DRAWINGS

These and other features of this invention will be more readily understood from the following detailed description of the various aspects of the invention taken in conjunction with the accompanying drawings in which.

Figure 1:
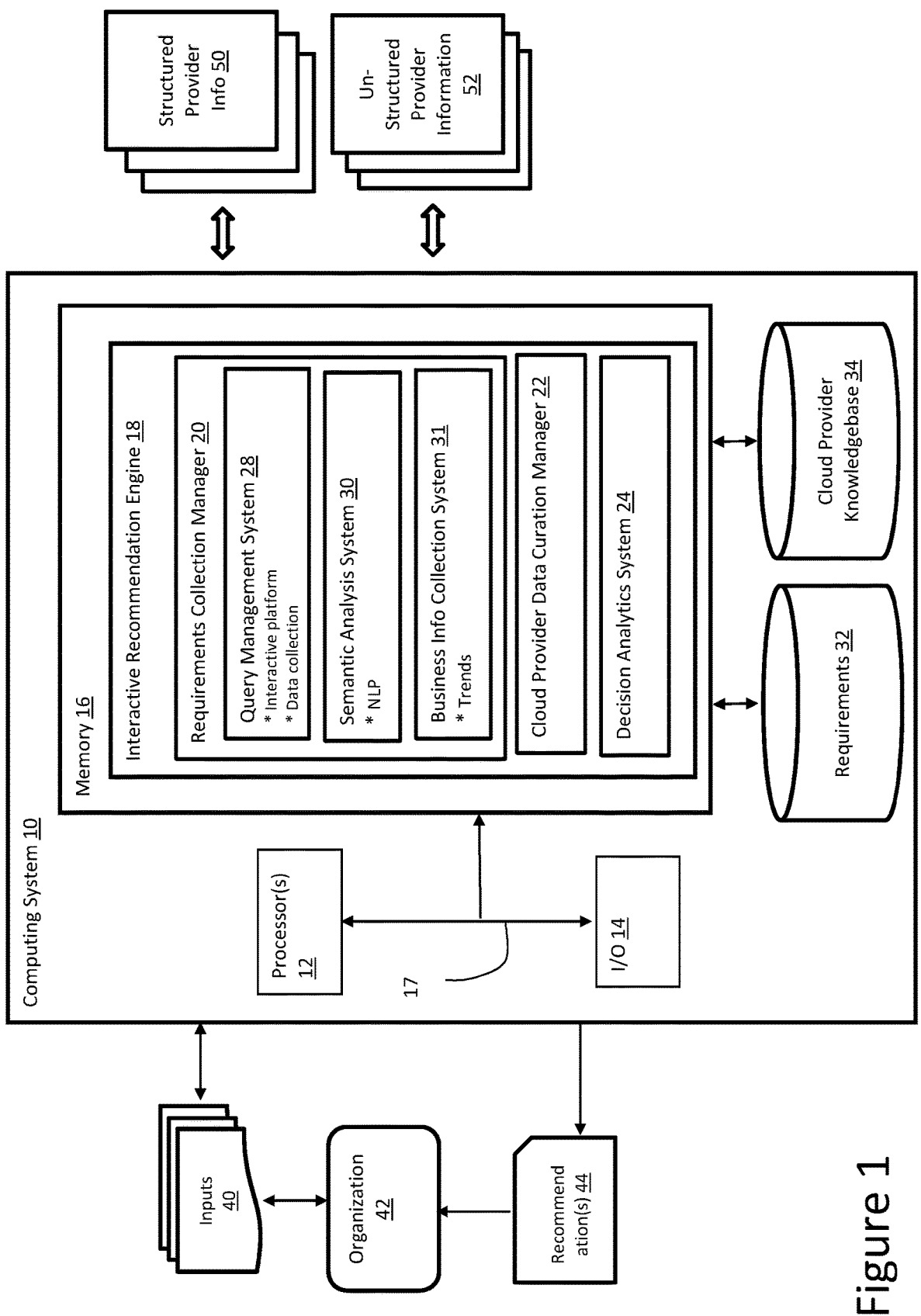
FIG. 1 shows a computing system having a provider recommendation system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having an interactive recommendation engine 18 for providing a recommendation 44 for a cloud provider and associated solution model that will best match the needs of an organization 42. A cloud provider may comprise any type of entity that provides network-based resources that can be accessed over a network by resource consumers, such as an organization.

The interactive recommendation system 18 uses structured as well as non-structured input, e.g., natural language (NL), from the organization 42 to determine a set of requirements 32. The requirements 32 may include, for example, business needs, financial constraints (i.e., budget), and technical requirements. Technical requirements may include resource usage requirements, technical capabilities, e.g., OS/Middleware technology, connectivity required to other data sources and legacy applications, etc.

Interactive recommendation system 18 also continuously and autonomously curates a cloud provider knowledgebase 34 with inputted structured provider information 50, such as cloud provider data sheets and solution models, as well as unstructured provider information 52 including information found in user reviews, blogs, articles, technical journals, social media, etc. Based on both the requirements 32 of the organization 42 and the cloud provider knowledgebase 34, one or more recommendations 44 for cloud providers are identified from a set of cloud providers.

As shown in FIG. 1, interactive recommendation engine 18 generally includes a requirements collection manager 20 that determines a set of requirements 32 based on inputs 40 from the organization 42; a cloud provider data curation manager 22 that curates and collects structured provider information 50 and unstructured provider information 52; and a decision analytics system 24 that analyzes collected requirements 32 and cloud provider data to identify recommendation(s) 44.

Requirements collection manager 20 provides an interactive interface with the organization 42 (and associated user(s)) to analyze inputs 40 to determine a set of requirements 32. To collect such information, a query management system 28 implements an interactive platform that provides a dialog with a user to achieve data collection. In one illustrative embodiment, query management system 28 may receive queries from or pose queries to organization 42 about their needs. The dialog may be done using natural language (NL), either spoken or typed, to elicit information. A semantic analysis system 30 is utilized, e.g., with a natural language processor (NLP), to identify a language independent meaning or intent of the dialog.

For example, a user within an organization 42 (O) may engage in the following dialog with interactive recommendation engine 18 (E):

(O) "We are looking to move our online retail store onto the cloud, can you help?"

(E) "Yes, can you give me some technical information?"

(O) "It involves a web application and a database server . . . . I will upload the topology and configuration"

(E) "What issues are you having with your current set up?"

(O) "Our e-commerce does not support high peak utilization and I am paying too much in maintenance."

(E) "OK, can you tell a little bit about the type of goods you sell?"

(O) "We sell widgets ranging in prices from $20-100"

(E) "How many widgets do you sell in a typical month?"

(O) "We sell about $100 k on average"

(E) "Tell me about your sales history and future expectations"

(O) "We plan to grow about 200% in the next few years, and we are at 90% utilization."

(E) "How many different SKUs do you carry?"

(O) "About 2000"

(E) "What are concerns do you have"

(O) "I don't want to maintain a team to support the environment"

. . .

(O) "What are the different pricing options? As a growing company we are trying to converse our cash flow"

. . .

As can be seen by this example, query management system 28 attempts to guide an NL dialog (i.e., conversation) to elicit a set of inputs 40 that help define the requirements 32 of the organization 42. Accordingly, requirements 32 may include requirements defined by the organization, requirements that are unknown by the organization, priorities, features, costs, deployment timing, technical support, platform support, managed services options, recovery strategies, scalability, etc.

Semantic analysis system 30 evaluates each NL input, and applies logic to formulate an appropriate output (e.g., NL response) to maintain the dialog. Semantic analysis system 30 also identifies and extracts relevant data elements from the unstructured NL inputs, which are used to define requirements 32. Illustrative semantics technology include latent semantic analysis, explicit semantic analysis, probabilistic semantic analysis, etc.

The query process generally include obtaining unstructured input, decomposing the input, interpreting the input, obtaining information to formulate a response, computing an initial response, identifying additional information, and formulating a response (question or answer).

Requirements 32 may be stored in any manner, e.g., in an XML (extensible markup language) file, in a hierarchical or directed graph, etc. For example, query management system 28 may first seek to determine a general category of the type of resources being sought to define a high level node, and then query for more specific requirements 32 at lower level child nodes. Based on the responses, the system may further query at the grandchild node level and so forth until enough requirements 32 are collected to formulate a recommendation 44.

Regardless of the approach, requirements collection manager 20 will seek to not only collect: (1) technical and (2) budgetary information, but also (3) business information. Accordingly, a business information collection system 31 is provided to ensure that, for example, collected business information includes: the type of business involved, current sales volume, historical sales information, growth projections, business strategy including current and future customer markets, product expansion planning, current strength and weaknesses of the organization, names of competitors, support requirements such as available online forums, etc.

A feature of the business information collection system 31 is the ability to capture business trends of the organization. The trends will be used to help identify the needs of the organization at future points in time. For example, if it is known that the organization's sales are increasing at a particular rate, then the interactive recommendation engine 18 will ensure that the recommended provider can handle projected growth.

As noted, on the back end, cloud provider data curation manger 22 continuously and autonomously curates a cloud provider knowledgebase 34. Data sources include structured provider information 50 such as data sheets and solution models associated with a set of cloud providers, including specifications, capabilities, costs, investment plans, historical data, volume, demand, etc. Also collected is unstructured provider information 52, which may include information from social media, blogs, user reviews, technical papers, etc. Thus for example, it may be known from user reviews that a particular cloud provider provides excellent technical support while another provider provides little or no technical support. In another example, it may be determined that certain cloud providers are changing their pricing models to attract certain types of customers.

Decision analytics system 24 analyzes the requirements 32 of the organization along with the curated cloud provider knowledgebase 34 to identify one or more recommendations for the organization 42 about which cloud provider(s) most closely meets these requirements. The analysis may be done in any manner. For example, for each of the identified requirements 32, a score may be provided for each provider. Weighting may be assigned to different requirements based on an importance determined by the requirements collection manager 20.

For instance, consider a simple example with 10 providers and three identified requirements for a technical, a budget and a business need: (1) a desired transactional speed; (2) a desired budget range; and (3) an active online user forum in the same space. Each may be weighted (w1, w2, w3) based on importance to the organization, and then each provider would receive a resulting score. For example:
Provider 1 (8*w1)+(6*w2)+(7*w3)
Provider 2 (4*w1)+(8*w2)+(1*w3)
. . .
In this case, the provider with the highest score would receive the recommendation. If budget was deemed the highest priority, then w2 may be assigned a weight of 1.5, while w1 and w3 received weights of 1.0. Obviously, more complex formulations may be utilized.

Figure 2:
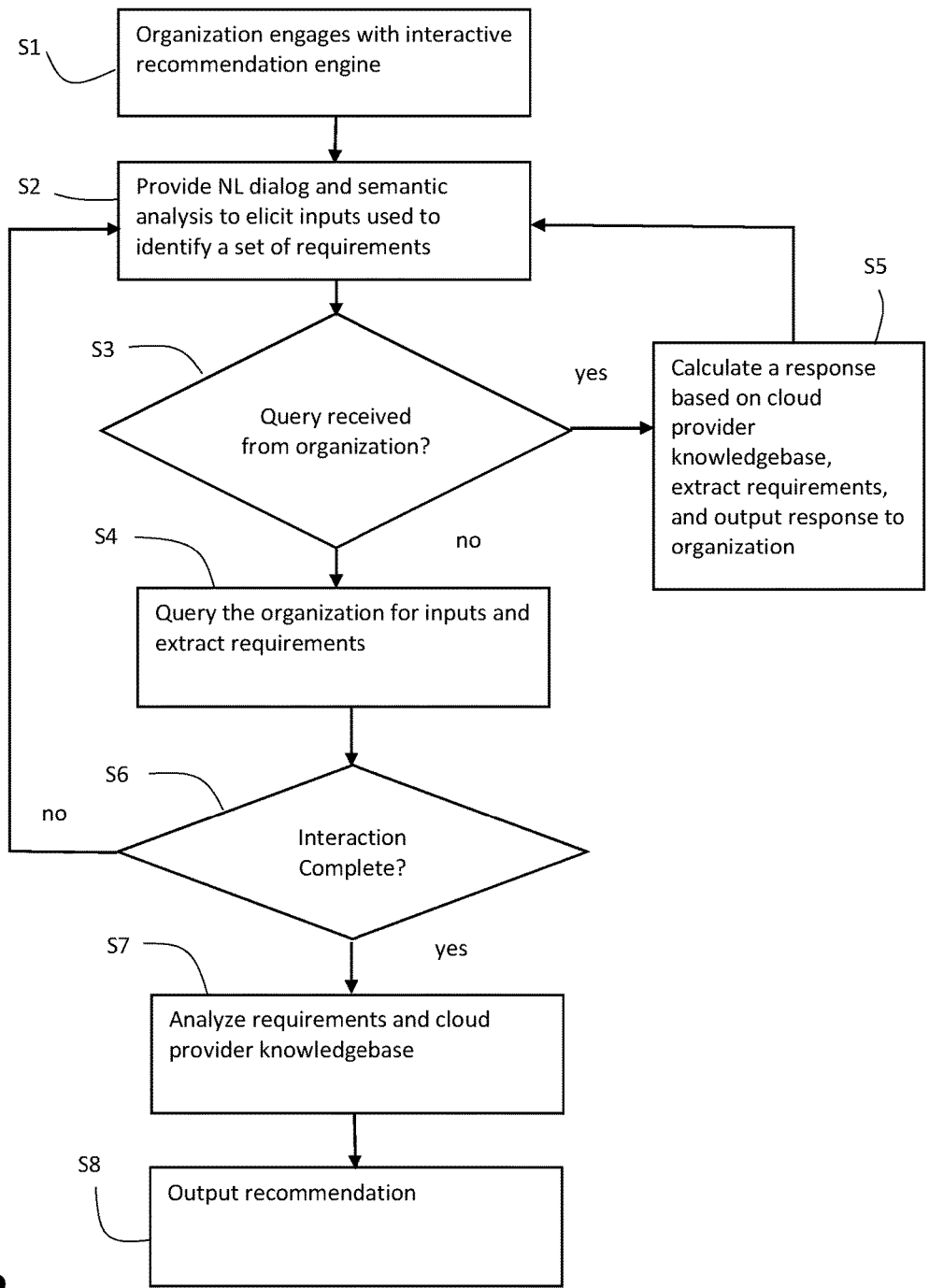
FIG. 2 shows a flow diagram of a recommendation process according to embodiments.

FIG. 2 depicts a flow diagram of a process of using interactive recommendation engine 18. At S1, an organization 42 engages with interactive recommendation engine 18, e.g., via an interface, voice dialog, etc. At S2, a natural language dialog and semantic analysis are used to elicit inputs 40 to identify a set of requirements 32. If a query is received from the organization (yes at S3), a response is formulated based on the cloud provider knowledgebase 34, requirements 32 are extracted, and a response is outputted at S5. For example, if a user queried "can you recommend a provider that can handle XYZ need?" Engine 18 would look to its cloud provider knowledgebase 34 to determine what, if any, providers exist to meet the XYZ need, extract the inputted XYZ need to help identify a requirement 32, and outputs a response. In illustrative output may be "We're aware of several providers who can help. Can you give me some additional details?" The process then loops back to S2.

If the organization 42 does not have any further queries (no at S3), the engine 18 may query the organization 42 for inputs 40 to extract requirements 32 at S4. If the interaction is not complete, no at S6 (i.e., additional requirements 32 are needed), the process loops back to S2. If the interaction is complete, yes at S6, then the requirements 32 and cloud provider knowledgebase 34 and analyzed at S7 and a recommendation is outputted at S8.

It is understood that interactive recommendation engine 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the interactive recommendation engine 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

It is understood that although this disclosure includes a detailed description that may be utilized to provide cloud-based computing services, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 3:
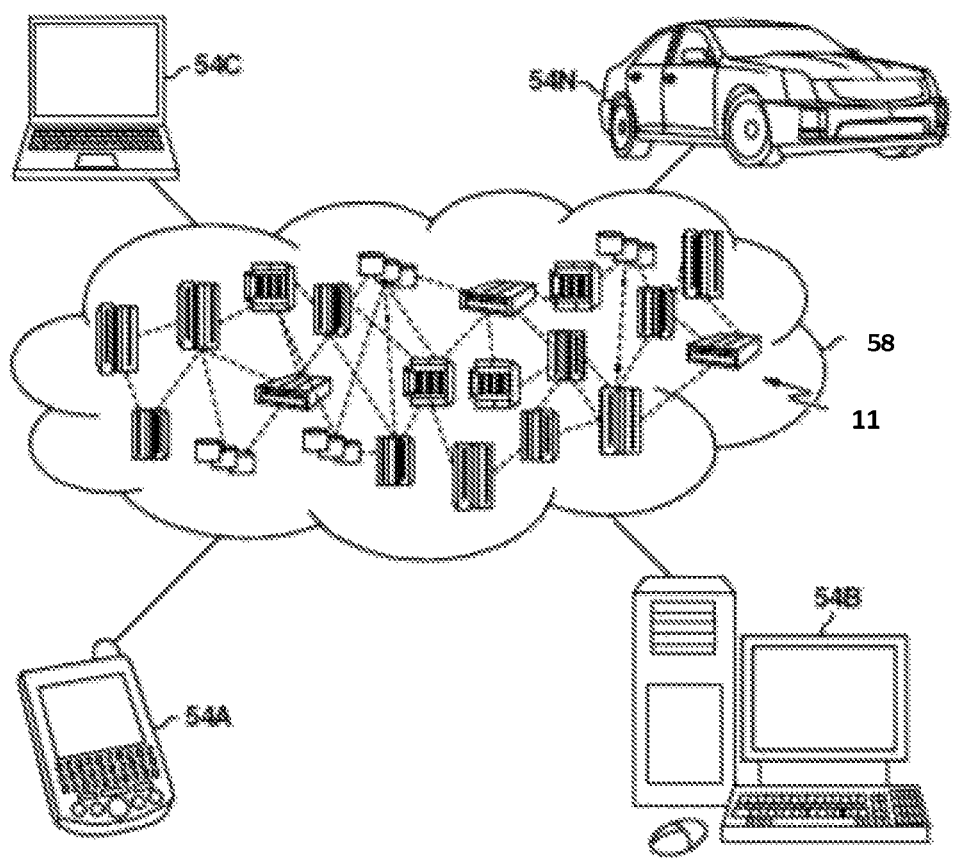
FIG. 3 depicts a cloud infrastructure according to embodiments.

A cloud computing environment is service oriented with a focus on statelessness, low coupling, modularity, and semantic interoperability. At the heart of cloud computing is an infrastructure comprising a network of interconnected nodes. Referring now to FIG. 3, illustrative cloud computing environment 58 is depicted. As shown, cloud computing environment 58 comprises one or more cloud computing nodes 11 with which local computing devices used by cloud consumers, such as, for example, personal digital assistant (PDA) or cellular telephone 54A, desktop computer 54B, laptop computer 54C, and/or automobile computer system 54N may communicate. Nodes 11 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 11 and cloud computing environment 58 can communicate with any type of computerized device over any type of network and/or network addressable connection (e.g., using a web browser).

Figure 4:
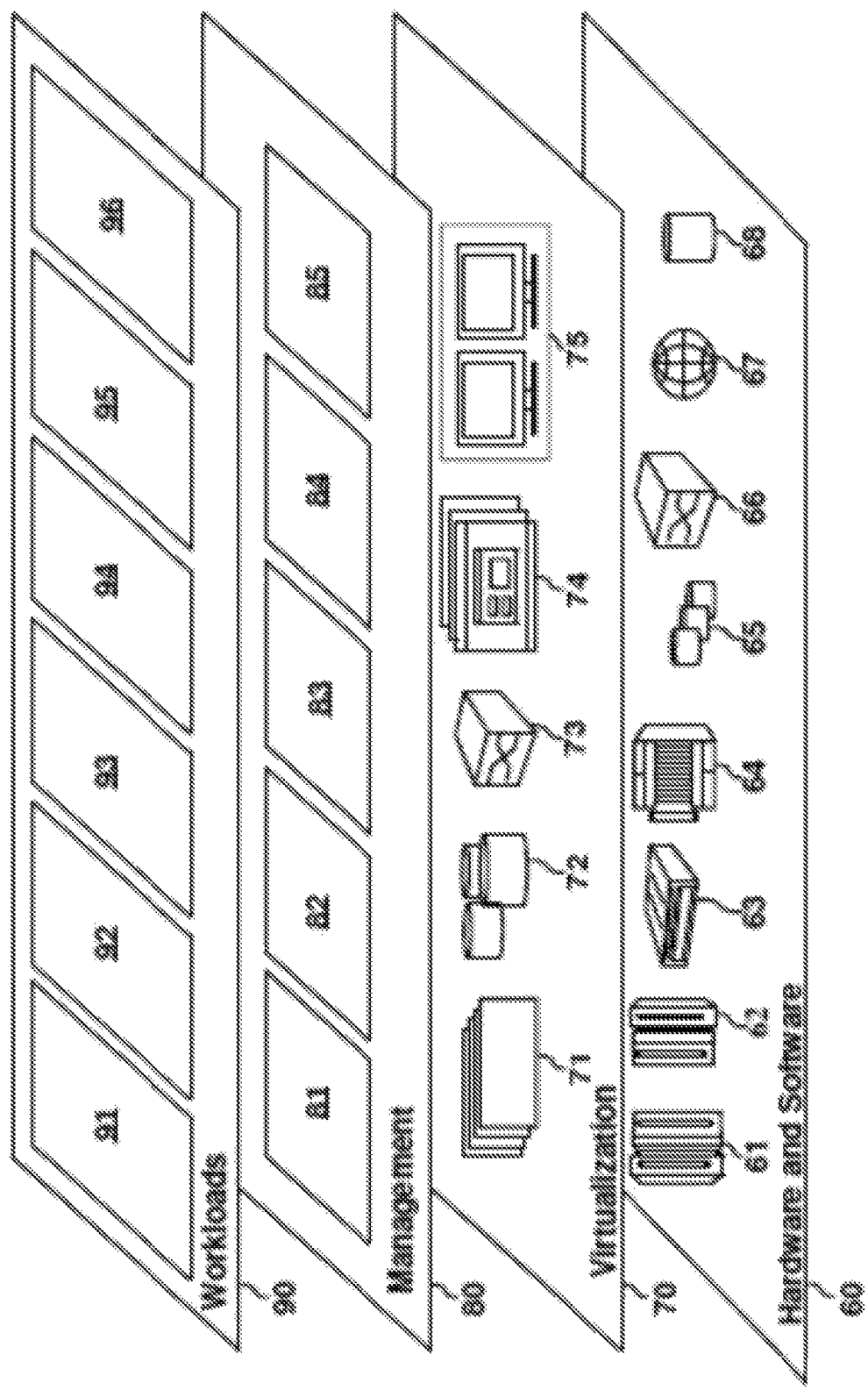
FIG. 4 depicts a cloud infrastructure according to embodiments.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided: Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in this case DRaaS.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method, comprising:

collecting a set of cloud computing requirements from an organization, wherein the collecting includes utilizing an interactive platform that provides a natural language dialog with a user and analyzing inputs from the user to identify the set of cloud computing requirements and formulate outputs to the user, wherein collecting the set of cloud computing requirements utilizing the interactive platform comprises:

generating a first question for the user within the organization;

providing the first question to the user;

receiving a first response to the first question;

analyzing the first response using a natural language processor;

generating, based on the analyzing the first response, a second question, wherein the second question is related to the first response;

providing the second question to the user;

receiving a second response to the second question; and extracting relevant data elements from the first and second responses using semantic analysis, wherein the relevant data elements are data elements that correspond to cloud computing requirements of the organization;

collecting business information about the organization including at least one trend, wherein the at least one trend is used to help identify needs of the organization at future points in time;

curating structured and unstructured provider information into a provider knowledgebase; analyzing the set of cloud computing requirements, the business information, and the provider knowledgebase to identify a recommended resource provider; and implementing, by the recommended resource provider, a cloud-based computing solution, based on the set of requirements.

2. The method of claim 1, wherein the business information includes data selected from a group consisting of: a type of business involved, current sales volume, historical sales information, growth projections, a business strategy including current and future customer markets, product expansion planning, strengths and weaknesses of the organization, names of competitors, and support requirements.

3. The method of claim 1, wherein the recommended resource provider comprises a cloud provider selected from a set of cloud providers.

4. The method of claim 3, wherein the structured provider information includes data sheets and solution models obtained from the set of cloud providers.

5. The method of claim 1, wherein the unstructured provider information includes information obtained from at least one of social media, blogs and user reviews.

6. The method of claim 5, further comprising:
determining, using natural language processing, from social media that one or more cloud providers are changing their pricing models; and
updating provider information related to the one or more cloud providers in the provider knowledgebase.

7. The method of claim 1, wherein analyzing the set of cloud computing requirements and the provider knowledgebase to identify the recommended resource provider further comprises:
applying a set of weights to the set of cloud computing requirements based on a determined importance to the organization; and
correlating the set of weights with the provider knowledgebase to identify the recommended resource provider.

8. A system, comprising:
a processor; and
a computer-readable storage medium communicatively coupled to the processor and storing program instructions which, when executed by the processor, cause the processor to perform a method comprising:
collecting a set of cloud computing requirements from an organization, wherein the collecting includes utilizing an interactive platform that provides a natural language dialog with a user and analyzing inputs from the user to identify the set of cloud computing requirements and formulate outputs to the user, wherein collecting the set of cloud computing requirements utilizing the interactive platform comprises:
generating a first question for the user within the organization;
providing the first question to the user;
receiving a first response to the first question;
analyzing the first response using a natural language processor;
generating, based on the analyzing the first response, a second question, wherein the second question is related to the first response;
providing the second question to the user;
receiving a second response to the second question; and
extracting relevant data elements from the first and second responses using semantic analysis, wherein the relevant data elements are data elements that correspond to cloud computing requirements of the organization;

collecting business information about the organization including at least one trend, wherein the at least one trend is used to help identify needs of the organization at future points in time;

curating structured and unstructured provider information into a provider knowledgebase;

analyzing the set of cloud computing requirements, the business information, and the provider knowledgebase to identify a recommended resource provider; and implementing, by the recommended resource provider, a cloud-based computing solution, based on the set of requirements.

9. The system of claim 8, wherein the business information includes data selected from a group consisting of: a type of business involved, current sales volume, historical sales information, growth projections, a business strategy including current and future customer markets, product expansion planning, strengths and weaknesses of the organization, names of competitors, and support requirements.

10. The system of claim 8, wherein the recommended resource provider comprises a cloud provider selected from a set of cloud providers.

11. The system of claim 10, wherein the structured provider information includes data sheets and solution models obtained from the set of cloud providers.

12. The system of claim 8, wherein the unstructured provider information includes information obtained from social media.

13. The system of claim 12, wherein the method performed by the processor further comprises:
determining, using natural language processing, from social media that one or more cloud providers are changing their pricing models; and
updating provider information related to the one or more cloud providers in the provider knowledgebase.

14. The system of claim 8, wherein analyzing the set of cloud computing requirements and the provider knowledgebase to identify the recommended resource provider further comprises:
applying a set of weights to the set of cloud computing requirements based on a determined importance to the organization; and
correlating the set of weights with the provider knowledgebase to identify the recommended resource provider.

15. The system of claim 8, wherein curating structured and unstructured provider information into a provider knowledgebase is performed continuously and autonomously by the system.

16. A computer program product comprising a computer-readable storage medium having program instructions embodied therewith, wherein the computer-readable storage medium is not a transitory signal per se, the program instructions executable by a processor to cause the processor to perform a method comprising:
collecting a set of cloud computing requirements from an organization, wherein the collecting includes utilizing an interactive platform that provides a natural language dialog with a user and analyzing inputs from the user to identify the set of cloud computing requirements and formulate outputs to the user, wherein collecting the set of cloud computing requirements utilizing the interactive platform comprises:
generating a first question for the user within the organization;
providing the first question to the user;
receiving a first response to the first question;
analyzing the first response using a natural language processor;
generating, based on the analyzing the first response, a second question, wherein the second question is related to the first response;
providing the second question to the user;
receiving a second response to the second question; and
extracting relevant data elements from the first and second responses using semantic analysis, wherein the relevant data elements are data elements that correspond to cloud computing requirements of the organization;
collecting business information about the organization including at least one trend, wherein the at least one trend is used to help identify needs of the organization at future points in time;
curating structured and unstructured provider information into a provider knowledgebase;
analyzing the set of cloud computing requirements, the business information, and the provider knowledgebase to identify a recommended resource provider; and
implementing, by the recommended resource provider, a cloud-based computing solution, based on the set of requirements.

17. The computer program product of claim 16, wherein the business information includes data selected from a group consisting of: a type of business involved, current sales volume, historical sales information, growth projections, a business strategy including current and future customer markets, product expansion planning, strengths and weaknesses of the organization, names of competitors, and support requirements.

18. The computer program product of claim 16, wherein the unstructured provider information includes information obtained from social media.

19. The computer program product of claim 18, wherein the method performed by the processor further comprises:
determining, using natural language processing, from social media that one or more cloud providers are changing their pricing models; and
updating provider information related to the one or more cloud providers in the provider knowledgebase.

* * * * *